United States Patent [19]
Horii

[11] Patent Number: 6,072,696
[45] Date of Patent: *Jun. 6, 2000

[54] ELECTRONIC APPARATUS WITH VENTILATION STRUCTURE

[75] Inventor: Yasuyuki Horii, Tokyo, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/923,896

[22] Filed: Sep. 4, 1997

[30] Foreign Application Priority Data

Nov. 1, 1996 [JP] Japan .................................. 8-292013

[51] Int. Cl.$^7$ ...................................................... H05K 7/20
[52] U.S. Cl. ........................................... 361/695; 454/184
[58] Field of Search .................................. 62/418, 259.2; 312/223.1, 236; 165/80.3, 122–126; 454/184, 353; 364/708.1; 361/725–732, 685, 687, 692–695, 717–719

[56] References Cited

U.S. PATENT DOCUMENTS

| | | | |
|---|---|---|---|
| 4,489,363 | 12/1984 | Goldberg | 361/693 |
| 4,744,005 | 5/1988 | Milani | 361/687 |
| 4,949,934 | 8/1990 | Krenz | 361/692 |
| 5,460,441 | 10/1995 | Hastings | 361/687 |
| 5,485,350 | 1/1996 | Hecht | 361/692 |
| 5,587,881 | 12/1996 | Wang | 361/695 |
| 5,596,483 | 1/1997 | Wyler | 361/683 |
| 5,751,549 | 5/1998 | Eberhardt | 361/687 |
| 5,793,610 | 8/1998 | Schmitt | 361/695 |

FOREIGN PATENT DOCUMENTS

2276275 9/1994 United Kingdom .................... 361/687

*Primary Examiner*—Gerald Tolin
*Attorney, Agent, or Firm*—Finnegan, Henderson, Farabow, Garrett & Dunner, L.L.P.

[57] ABSTRACT

The housing of a portable computer has a pack storing section for storing a pack shaped device. First ventilation holes for keeping the inside of the housing in communication with the inside of the pack storing section are formed in an inner wall of the housing defining the pack storing section. The pack shaped device is provided with air intake holes open to the outer surface of the device, second ventilation holes respectively arranged to face the corresponding first ventilation holes, and an air flow path for keeping the suction holes and the second ventilation holes in communication with each other. As a fan arranged in the housing to oppose an exhaust port of the housing is rotated, fresh air is introduced into the pack shaped device through the air intake holes and further into the housing through the air flow path and the first and second ventilation holes.

17 Claims, 8 Drawing Sheets

ELECTRONIC APPARATUS WITH VENTILATION STRUCTURE

BACKGROUND OF THE INVENTION

This invention relates to a portable electronic ventilation apparatus such as a notebook-type portable computer and, more particularly, it relates to a portable electronic ventilation apparatus wherein a pack shaped device is detachably fitted to the housing of the apparatus.

While known portable computers are mostly designed to deal with characters and graphics, there is a demand for portable computers designed to adapt itself to a so-called multi-media environment and capable of dealing with animated pictures and real sounds including human voices in addition to characters and graphics. Since the volume of data that should be processed by such a portable computer to deal with animated pictures and real sounds is enormous if compared with a predecessor computer designed to simply deal with characters and graphics, it typically utilizes optical discs capable of storing a large volume of data. Thus, portable computers equipped with a CD-ROM drive unit for reading data from optical discs have been marketed.

Additionally, efforts have been made to produce portable computers having a down-sized and lightweight housing. For example, notebook-type personal computers having a B5 standard size smaller than those having an A4 standard size are currently getting an ever-increasing popularity.

On the other hand, due to the trend toward down-sized and lightweight housings, it is no longer possible for such a small housing to contain both a CD-ROM drive unit and a floppy disc drive unit at the same time. In an attempt to cope with this situation, there have been marketed portable computers adapted to selectively store a CD-ROM drive unit or a floppy disc drive unit in a housing. Such a housing of a portable computer is typically provided with a removable battery pack, a display unit, a keyboard, various connectors and slots.

A portable computer of the type under consideration typically comprises a pack storing section for selectively storing the CD-ROM drive unit or the floppy disc drive unit and a battery storing section for storing a battery pack, and each of the storing sections is normally open to the bottom and some of the lateral sides of the housing. When the CD-ROM drive unit or the floppy disc drive unit and the battery pack are stored in the storing sections of the housing, they serve as part of the bottom and also as part of the lateral sides of the housing.

Meanwhile, as portable computers are made to be more versatile and efficient in recent years, their components generate heat at a rate higher than ever so that how to cool them effectively and keep them operating properly provides a serious problem to be solved. A currently popular technique for solving this problem is the use of a fan arranged within the housing and designed to expel the heat from the housing. Further, the housing is provided with a large number of air intake holes for introducing fresh air into the housing from outside.

As described above, as the housing of a portable computer of the type under consideration is down-sized, the pack shaped device, the battery pack, connector covers and slot covers serve as part of the outer surface of the housing to a large proportion, thereby reducing the exposed surface area of the housing per se.

This means that the housing is provided with less space for arranging air intake holes for cooling the inside of the housing. At the same time, the inside of the housing is crowded by components so much that it is difficult to secure a sufficient air flow path within the housing. Thus, it is difficult to effectively cool the heat generating components within the housing.

Additionally, known portable computers of the type under consideration are not provided with means for cooling the pack shaped device that is removably mounted in the housing.

BRIEF SUMMARY OF THE INVENTION

The present invention has been contrived in consideration of the above circumstances and its object is to provide a portable electronic ventilation apparatus which is capable of efficiently cooling the inside of the apparatus housing and the pack shaped device mounted in the housing.

According to an aspect of the invention, the above object is achieved by providing a portable electronic ventilation apparatus comprising a box-shaped housing having a pack storing section in the form of a recess which is open to an outer surface of the housing; a pack-shaped device serving as a packed module for performing a specified function, detachably stored in the pack storing section and constituting part of the outer surface of the housing; ventilating means for introducing fresh air into the housing through the inside of the pack storing section; and a fan arranged in the housing for sucking fresh air into the housing through the ventilating means and discharging it out of the housing by way of the inside of the housing.

According to another aspect of the invention, there is provided a portable electronic ventilation apparatus comprising a box-shaped housing having a pack storing section in the form of a recess open to an outer surface of the housing and an exhaust port open to the outer surface of the housing; a pack shaped device serving as a packed module for performing a specified function, detachably stored in the pack storing section and constituting part of the outer surface of the housing; and a fan arranged in the housing to face the exhaust port for discharging air out of the housing by way of the exhaust port.

The housing has an inner wall defining the pack containing section, and first ventilation holes formed in the inner wall for keeping the inside of the housing in communication with the inside of the pack storing section. The pack shaped device has a first lateral wall facing the inner wall, a second lateral wall constituting part of the outer surface of the housing, second ventilation holes formed in the first lateral wall and respectively communicating with the corresponding first ventilation holes, air intake holes formed in the second lateral wall and open to the outside, and an air flow path for keeping the air intake holes in communication with the second ventilation holes.

With either of the above arrangements, once the fan is operated, fresh air is introduced into the housing by way of the inside of the pack shaped device mounted in the housing and then discharged to the outside after flowing through the inside of the housing. Thus, the inside of the pack shaped device and the housing is cooled by the introduced fresh air.

Accordingly, the electronic parts arranged in the housing are effectively cooled along with the pack shaped device. Since fresh air is introduced by utilizing the inside of the pack shaped device, fresh air can be led to any desired spot in the housing for effective cooling. Additionally, since the outer surface of the housing is not required to have an additional space for introducing fresh air, the housing can be further down-sized.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 through 10 illustrate a portable computer according to a preferred embodiment of the invention, in which:

DETAILED DESCRIPTION OF THE INVENTION

A portable computer according to an embodiment of the present invention will be described in detail with reference to the accompanying drawings.

Figure 1:
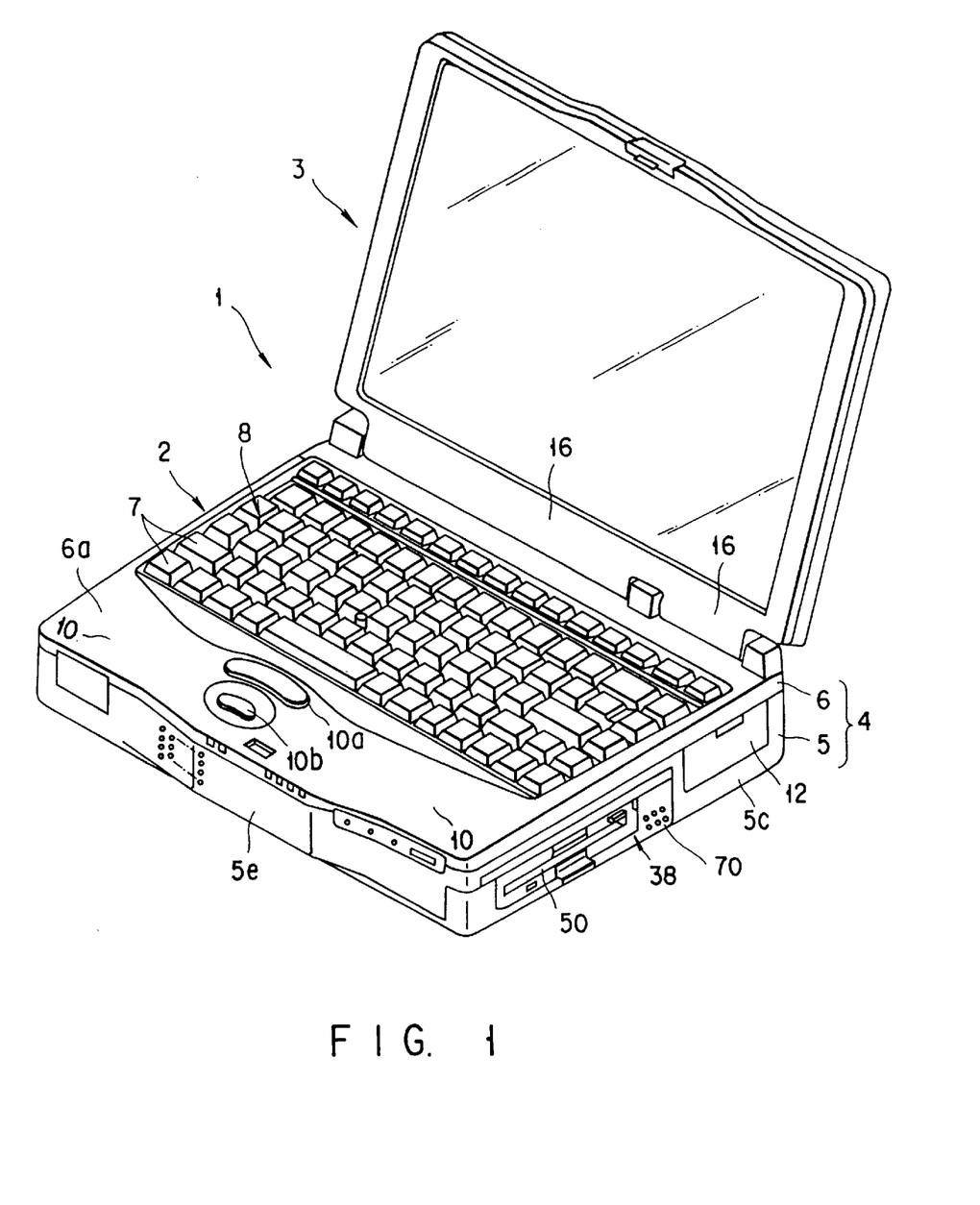
FIG. 1 is a perspective view of the portable computer.
Figure 2:
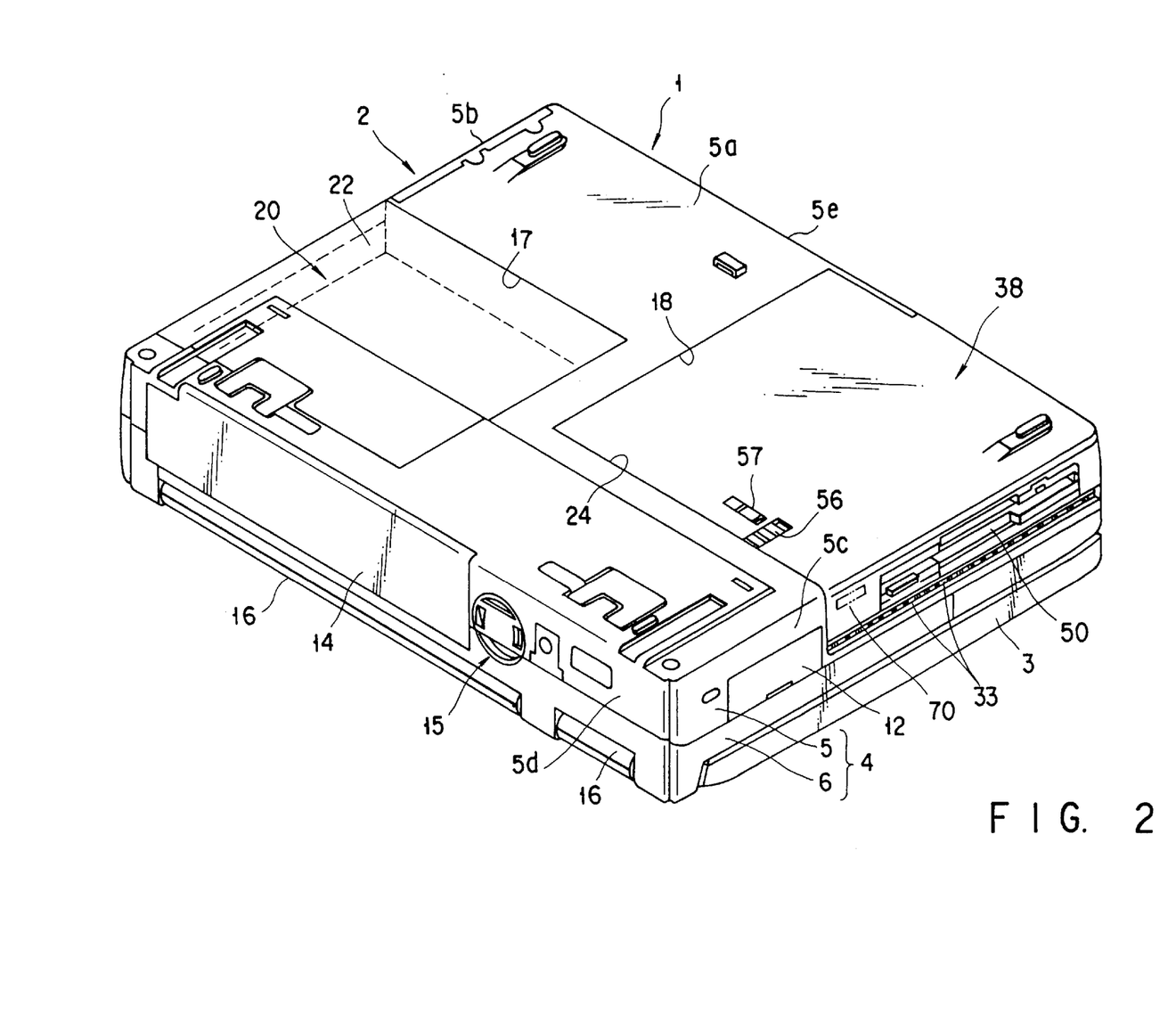
FIG. 2 is a perspective bottom view of the portable computer.

Referring firstly to FIGS. 1 and 2, a notebook type portable computer 1 having a B5 standard size comprises a computer main body 2 to be typically placed on a desk, and a display unit 3 swingably supported on the computer main body 2.

The computer main body 2 has a housing 4 formed of synthetic resin. The housing 4 comprises a lower housing 5 open at the top and an upper housing 6 removably fitted to the opened top of the lower housing 5.

The lower housing 5 has a substantially rectangular flat bottom wall 5a along with right and left lateral walls 5b and 5c, a rear wall 5d and a front wall 5e extending upwardly from the respective peripheral edges of the bottom wall 5a.

The upper housing 6 is in fact realized in the form of a panel having a substantially flat top wall 6a. The top wall 6a is opposite to the bottom wall 5a of the lower housing 5 and the peripheral edges of the top wall 6a are linked to the respective upper edges of the lateral walls 5b, 5c, the rear wall 5d and the front wall 5e of the lower housing 5 to consequently form a flat and rectangular box-like housing 4.

A keyboard 8 comprising a number of keys 7 is arranged on a rear half portion of the top wall 6a of the upper housing 6. The keyboard 8 serving as input means has a rectangular contour with a width substantially equal to that of the top wall 6a. A front half portion, or the remaining portion of the top wall 6a provides an arm rest 10 carrying at the center thereof click switches 10a, 10b to be used for executing and canceling commands.

The display unit 3 is swingably fitted to the rear end portion of the top wall 6a of the upper housing 6 by means of hinge sections 16. The display unit 3 is a flat rectangular shape having a width substantially same as that of the computer main body 2. As seen from FIG. 1, the display unit 3 is swingable between an open position where the keyboard 8 is exposed and can be used for input operations and the display screen is exposed and visible, and a closed position where the keyboard 8 is covered by the display unit. In the closed position, the display unit 3 is combined with the computer main body 2, and they show a notebook-like profile.

At the rear end portion of the right lateral wall 5c of the lower housing 5 is provided a swingable model cover 12 for opening and closing a modem inlet port of a modem storing section (not shown) which is formed in the housing 4. The housing 4 is provided on the rear wall thereof with a plurality of connectors (not shown) including an RGB connector, an RS-232C connector and expansion connector. The connectors are covered by a connector cover 14 swingably fitted to the rear wall of the housing 4. Additionally, the housing 4 is provided on the rear wall including the rear wall 5d of the lower housing 5 with an exhaust port 15.

Referring to FIGS. 1 through 4, the lower housing 5 is also provided with a battery storing section 17 and a pack storing section 18. The battery storing section 17 is defined by a rectangular recess which is located at a left end portion of the lower housing 5 and opens to the bottom wall 5a and the left lateral wall 5b.

Figure 3:
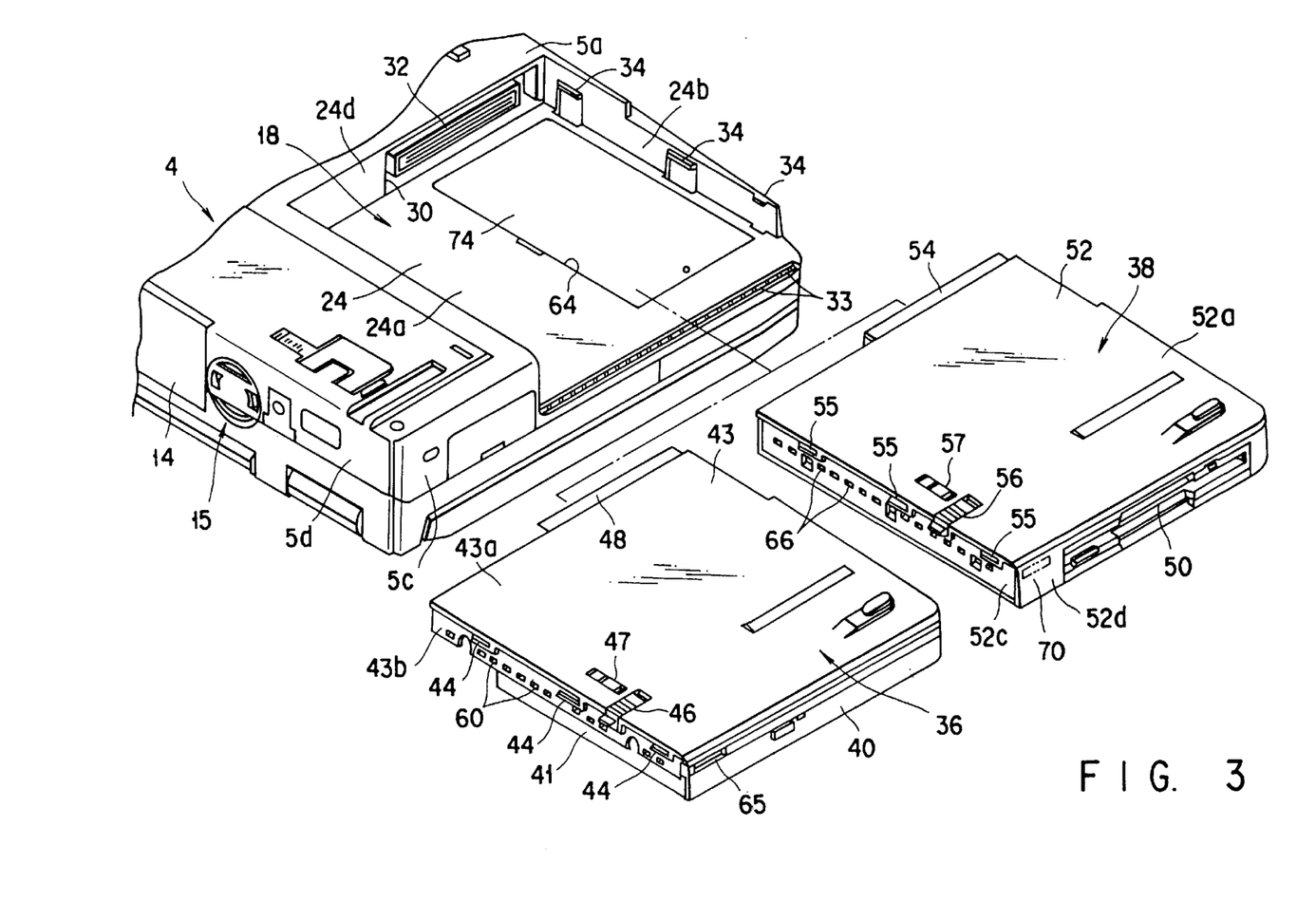
FIG. 3 is a perspective bottom view of the portable computer, also showing two pack shaped devices that may be used with the portable computer.

The battery storing section 17 removably contains a battery pack 20 operating as a power source for driving the computer 1 when no commercial power supply is available. The battery pack 20 typically comprises a battery case 22 made of synthetic resin and a plurality of cells (not shown) contained in the battery case.

The battery case 22 has dimensions substantially same as those of the battery storing section 17 and, when fitted in the battery storing section 17, its bottom surface and one of its lateral surfaces respectively serve as part of the bottom wall 5a and part of the left lateral wall 5b of the lower housing 5.

Figure 4:
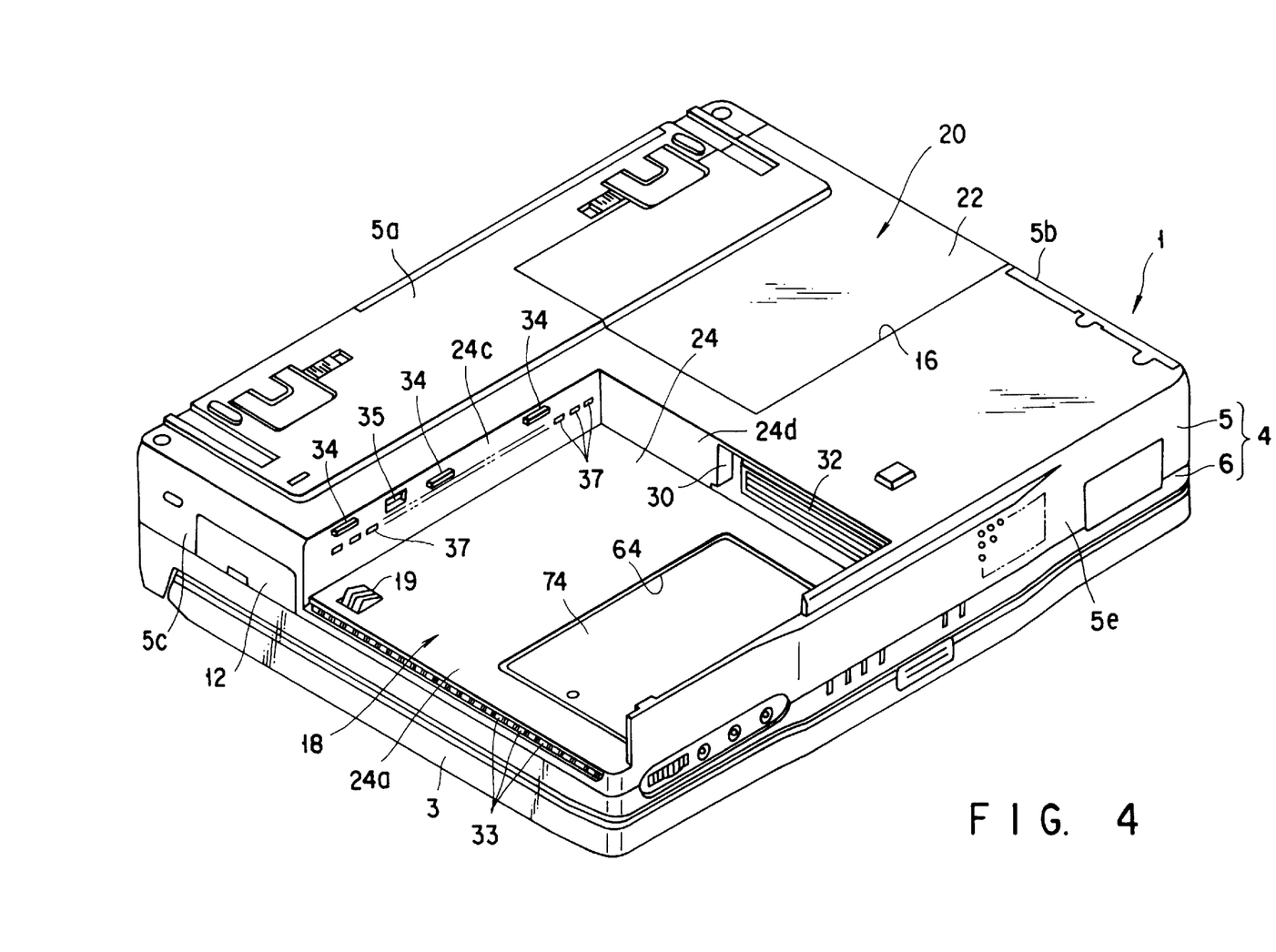
FIG. 4 is a schematic perspective bottom view of the portable computer from which a pack shaped device is removed.

The pack storing section 18 is defined by a rectangular recess 24 which is located at a right end portion of the lower housing 5 and opens to the bottom wall 5a and the right lateral wall 5c. The recess 24 is defined by inner walls of the lower housing 5. More specifically, the inner walls includes a rectangular bottom panel 24a extending from the right lateral wall 5c of the lower housing 5 in parallel to the bottom wall 5a thereof, a pair of oppositely disposed side panels 24b, 24c extending from the respective edges of the bottom panel 24a in the transversal direction of the housing 4, and a back panel 24d extending from the edge of the bottom panel 5a opposing the right lateral wall 5c of the lower housing 5. The side panels 24b, 24c, and back panel 24d extend perpendicular to the bottom panel 24a and are continued with the bottom wall 5a of the housing 4. Note that the side panel 24c is disposed vis-a-vis and in parallel with the rear wall 5d of the lower housing 5.

The bottom panel 24a, the left and right side panels 24b, 24c and the back panel 24d serve respectively as the bottom wall, the left and right side walls, and the back wall of the pack storing section 18. Thus, the pack storing section 18 has a rectangular box-like profile that is open at the bottom side and the right lateral side of the lower housing 5.

The back panel 24d is provided with a narrow and oblong opening 30 and an interface connector 32 is arranged in the opening 30, facing the lateral wall 5c, and connected to a printed circuit board (not shown) arranged in the lower housing 5.

Each of the oppositely disposed side panels 24b, 24c is provided with a plurality of, e.g. three, engaging projections 34 at regular intervals in the transversal direction of the housing 4. Additionally, the side panel 24c has an engaging recess 35 for engaging an holding detent arranged on a pack shaped device as will be described later. Further, the side panel 24c is provided with a large number of first ventilation holes 37 arranged at regular intervals in the transversal direction of the housing 4 to keep the inside of the pack storing section 18 in communication with the inside of the housing 4.

As shown in FIG. 4, in the pack storing section 18, a conducting terminal 19 projects from the bottom panel 24a at the end portion close to the side panel 24c. The conducting terminal 19 is electrically connected to the ground the housing 4. Note that the right lateral wall 5c of the lower housing 5 is also provided with a large number of ventilation holes 33 located in the vicinity of the pack storing section 18 and arranged in the longitudinal direction of the right lateral wall 5c. The pack storing section 18 is provided on the bottom thereof with an insertion opening 64 to be used for introducing an optional device (not shown), which insertion opening 64 is normally closed by a removable metal cover 74.

As shown in FIGS. 1 through 3, the pack storing section 18 is designed to selectively and removably receive a CD-ROM drive unit 36 and a floppy disc drive unit 38. Such a CD-ROM drive unit 36 and a floppy disc drive unit 38 are provided as packed modules having identical dimensions and can be fitted into the pack storing section 18 for operation with a single pushing action.

Figure 5:
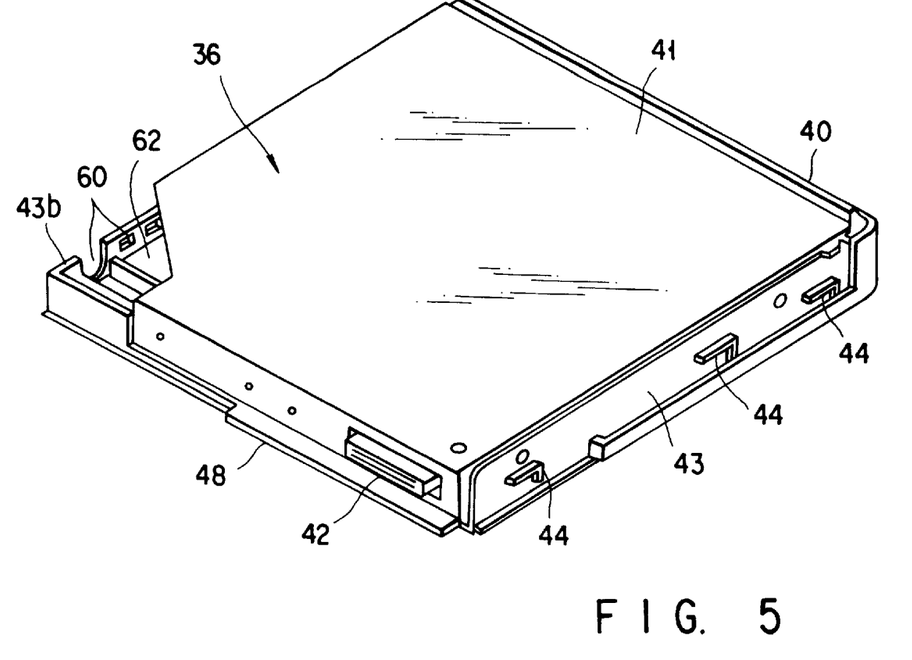
FIG. 5 is a perspective top view of a CD-ROM drive unit.
Figure 7:
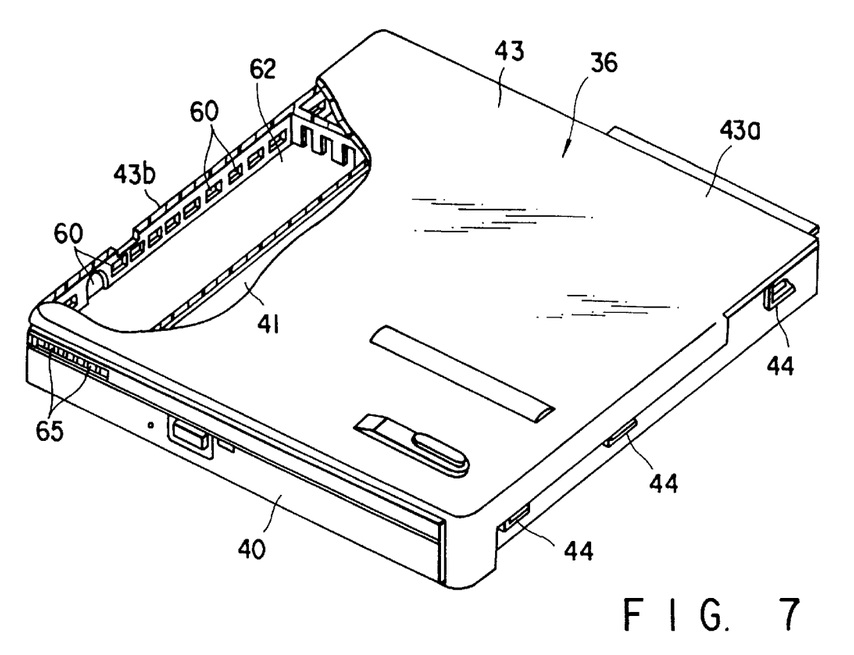
FIG. 7 is a partly cut-away perspective view of the CD-ROM drive unit viewed from the bottom side thereof.

Referring to FIGS. 3, 5 and 7, the CD-ROM drive unit 36 comprises a tray 40 for receiving an optical disc, and a metal housing 41 holding the tray 40 that can be drawn out. The housing 41 has a flat and rectangularly parallelepipedic profile and is provided with an interface connector 42 at the side opposite to the side from which the tray 40 is drawn out.

Additionally, the CD-ROM drive unit 36 has a synthetic resin cover 43 covering the bottom and the lateral sides of the housing 41. Each of the lateral side walls of the cover 43 is provided with three engaging projections 44 to be engaged respectively with the corresponding engaging projections 34 in the pack storing section 18. Each of the engaging projections 44 has an L-shaped cross section.

Referring to FIGS. 2 and 3, on the bottom wall 43a of the cover 43 is provided an anchoring detent 46 retractably projecting from a lateral edge of the bottom wall 43a and urged to project in that direction by a spring (not shown). The anchoring detent 46 comes into engagement with the corresponding engaging recess 35 arranged on the side panel 24c of the pack storing section 18 to hold the CD-ROM drive unit 36 inside the pack storing section 18 when the CD-ROM drive unit 36 is brought into the pack storing section 18.

On the bottom wall 43a of the cover 43 is further provided a slidable lock lever 47 for locking the anchoring detent 46 in the projecting state. Additionally, a panel-shaped positioning projection 48 protrudes from the rear edge of the bottom wall 43a of the cover 43. The positioning projection 48 is adapted to be introduced into and engaged with the opening 30 in the back panel 24d of the pack storing section 18.

Referring again to FIGS. 3, 5 and 7, the cover 43 comprises a side panel 43b which opposes the side panel 24c of the pack storing section 18 when the CD-ROM drive unit 36 is fitted in the pack storing section 18. The side panel 43b has a large number of second ventilation holes 60 arranged at regular intervals in the transversal direction of the housing 4. Note that the second ventilation holes 60 are arranged at a pitch same as the pitch of arrangement of the first ventilation holes 37 and located at a level same as that of the first ventilation holes 37 of the housing 4 when the CD-ROM drive unit 36 is mounted into the pack storing section 18.

An air flow path 62 is defined in the cover 43 and runs along the side panel 43b substantially over the entire transversal length of the CD-ROM drive unit 36. It is held in communication with the second ventilation holes 60. A plurality of air intake holes 65 are formed at an end of the tray 40 and communicate with the air flow path 62.

The CD-ROM drive unit 36 having a configuration as described above is fitted into the pack storing section 18 of the lower housing 5 through the opening thereof and then pushed toward the left lateral wall 5b of the lower housing 5 in the transversal direction of the housing 4. Then, the engaging projections 44 arranged on the cover 43 respectively come into engagement with the corresponding engaging projections 34 in the pack storing section 18 while the anchoring detent 46 becomes engaged with the corresponding engaging recess 35. At the same time, the interface connector 42 is coupled with the interface connector 32 of the housing 4.

Thus, the CD-ROM drive unit 36 is securely held in the pack storing section 18 and electrically connected to the computer main body 2. Under this condition, the bottom of the CD-ROM drive unit 36 is flush with the bottom wall 5a of the lower housing 5 to serve as part of the latter. Similarly, the front side of the tray 40 is aligned with the lateral wall 5c of the lower housing 5 to serve as part of the latter.

When the CD-ROM drive unit 36 is mounted into the pack storing section 18, the metal housing 41 contacts with the conducting terminal 19 projecting into the pack storing section 18 so that the CD-ROM drive unit 36 is electrically connected to the ground of the housing 4 by way of the conducting terminal 19.

Then, the side panel 43b of the cover 43 of the CD-ROM drive unit 36 directly-faces the side panel 24c of the pack storing section 18 in such a way that the second ventilation holes 60 on the side panel 43b respectively communicate with the corresponding first ventilation holes 37 on the side panel 24c. Thus, the inside of the housing 4 communicates with the outside of the computer 1 through the air intake holes 65, the air flow path 62, the second ventilation holes 60 of the CD-ROM drive unit 36, and the first ventilation holes 37 of the housing 4, so that air can be introduced into the housing 4 from the outside. As described above, the air intake holes 65, the air flow path 62, and the first and second ventilation holes 37, 60 serve as ventilation means for introducing air into the housing 4 through the CD-ROM drive unit 36.

Figure 6:
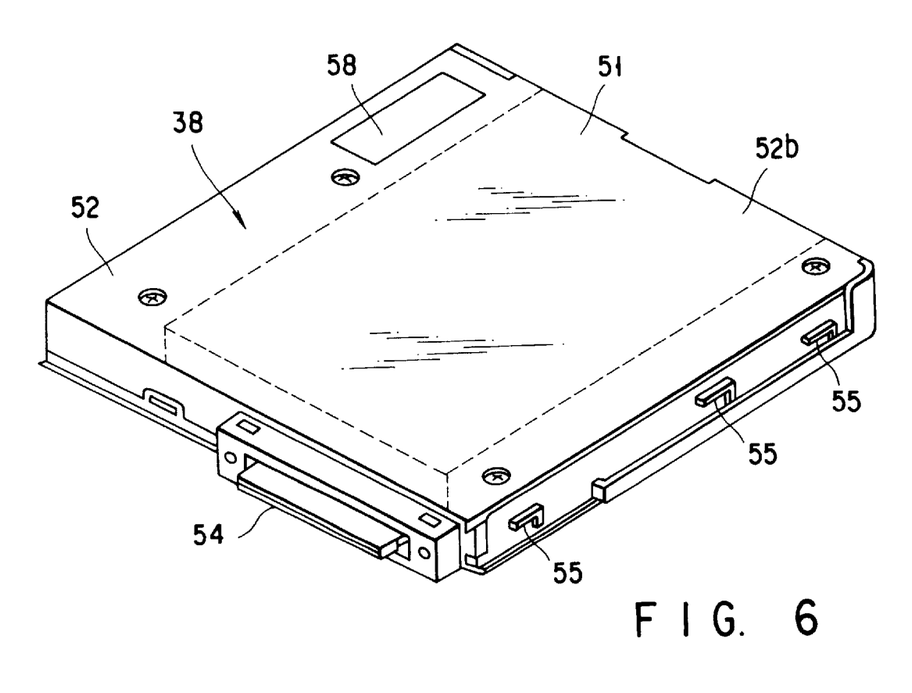
FIG. 6 is a perspective top view of a floppy disc drive unit.
Figure 8:
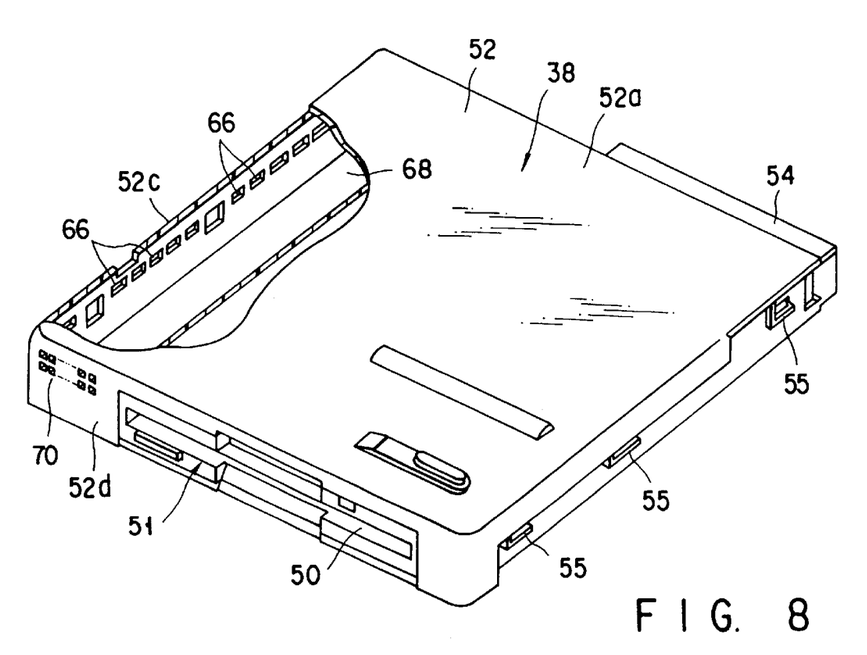
FIG. 8 is a partly cut-away perspective view of the floppy disc drive unit viewed from the top thereof.

On the other hand, as shown in FIGS. 3, 6 and 8, the floppy disc drive unit 38 comprises a flat and rectangularly parallelepipedic main body 51 having a floppy disc insertion port 50 on the front side thereof, and an outer synthetic resin cover 52 covering the main body 51. The outer cover 52 has a profile and dimensions substantially same as those of the CD-ROM drive unit 36. The outer cover 52 is provided on the side opposite to that of the floppy disc insertion port 50 with an interface connector 54 which is connected to the main body 51.

Each of the lateral walls of the outer cover 52 is provided with three engaging projections 55 to be respectively engaged with the corresponding engaging projections 34 of the pack storing section 18. Each of the engaging projections 55 has an L-shaped cross section. On the bottom wall 52*a* of the outer cover 52 is provided an anchoring detent 56 retractably projecting from a lateral edge thereof along the bottom wall 52*a* and urged to project in that direction by a spring (not shown). The anchoring detent 56 comes into engagement with the corresponding engaging recess 35 arranged on the side panel 24*c* of the pack storing section 18 to hold the floppy disc drive unit 38 in the pack storing section 18 when the floppy disc drive unit 38 is fitted into the pack storing section 18.

On the bottom wall 52*a* of the outer cover 52 is further provided a slidable lock lever 57 for locking the anchoring detent 56 in the projecting state. Additionally, a rectangular conducting metal plate 58 is fixed to the front end portion of the top wall 52*b* of the outer cover 52 and electrically connected to the main body 51 in the inside.

The outer cover 52 comprises a side panel 52*c* opposing the side panel 24*c* of the pack storing section 18 when the floppy disc drive unit 38 is placed in position in the pack storing section 18. The side panel 52*c* has a large number of second ventilation holes 66 arranged at regular intervals in the transversal direction of the housing 4. Note that the second ventilation holes 66 are arranged at a pitch same as the pitch of arrangement of the first ventilation holes 37 and located at a level same as that of the first ventilation holes 37 of the housing 4 when the floppy disc drive unit 38 is mounted into the pack storing section 18.

An air flow path 68 is defined in the outer cover 52 and runs along the side panel 52*b* substantially over the entire transversal length of the floppy disc drive unit 38. The air flow path 68 communicates with the second ventilation holes 66. A plurality of air intake holes 70 are formed at an end of the front panel 52*d* of the outer cover 52 and communicate with the air flow path 68.

The floppy disc drive unit 38 having the above-mentioned configuration is fitted into the pack storing section 18 of the lower housing 5 through the opening thereof and then pushed toward the left lateral wall 5*b* of the lower housing 5 in the transversal direction of the housing 4. Then, the engaging projections 55 arranged on the outer cover 52 respectively come into engagement with the corresponding engaging projections 34 in the pack storing section 18 while the anchoring detent 56 becomes engaged with the corresponding engaging recess 35. At the same time, the interface connector 54 is coupled with the interface connector 32 of the housing 4.

Thus, the floppy disc drive unit 38 is securely held in the pack storing section 18 and electrically connected to the computer main body 2. Under this condition, the bottom of the floppy disc drive unit 38 is flush with the bottom wall 5*a* of the lower housing 5 to serve as part of the latter. Similarly, the front panel 52*d* of the outer cover 52 is aligned with the lateral wall 5*c* of the lower housing 5 to serve as part of the latter.

When the floppy disc drive unit 38 is mounted into the pack storing section 18, the conducting plate 58 fixed to the outer cover 52 contacts with the conducting terminal 19 projecting into the pack storing section 18, so that the floppy disc drive unit 38 is electrically connected to the ground of the housing 4 by way of the conducting plate 58 and the conducting terminal 19.

Then, the side panel 52*c* of the outer cover 52 of the floppy disc drive unit 38 directly faces the side panel 24*c* of the pack storing section 18 in such a way that the second ventilation holes 66 on the side panel 52*c* respectively communicate with the corresponding first ventilation holes 37 on the side panel 24*c*. Thus, the inside of the housing 4 communicates with the outside of the computer 1 by way of the air intake holes 70, the air flow path 68, the second ventilation holes 66 of the floppy disc drive unit 38, and the first ventilation holes 37 of the housing 4, so that air can be introduced into the housing 4 from the outside. As described above, the air intake holes 70, the air flow path 68, and the first and second ventilation holes 37, 66 serve as ventilation means for introducing air into the housing 4 through the floppy disc drive unit 36.

Figure 9:
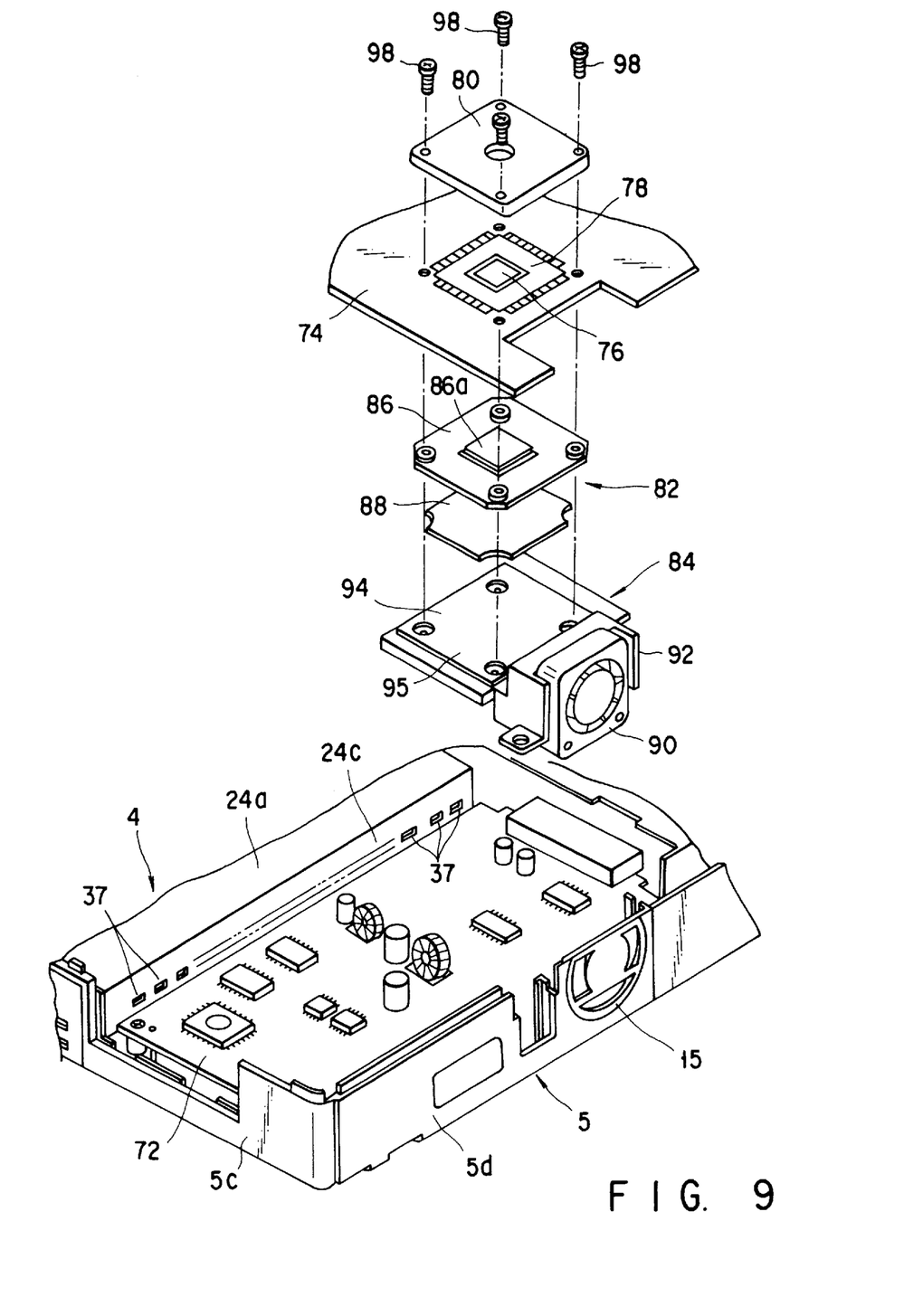
FIG. 9 is an exploded perspective view of the fan and the related components of the portable computer.
Figure 10:
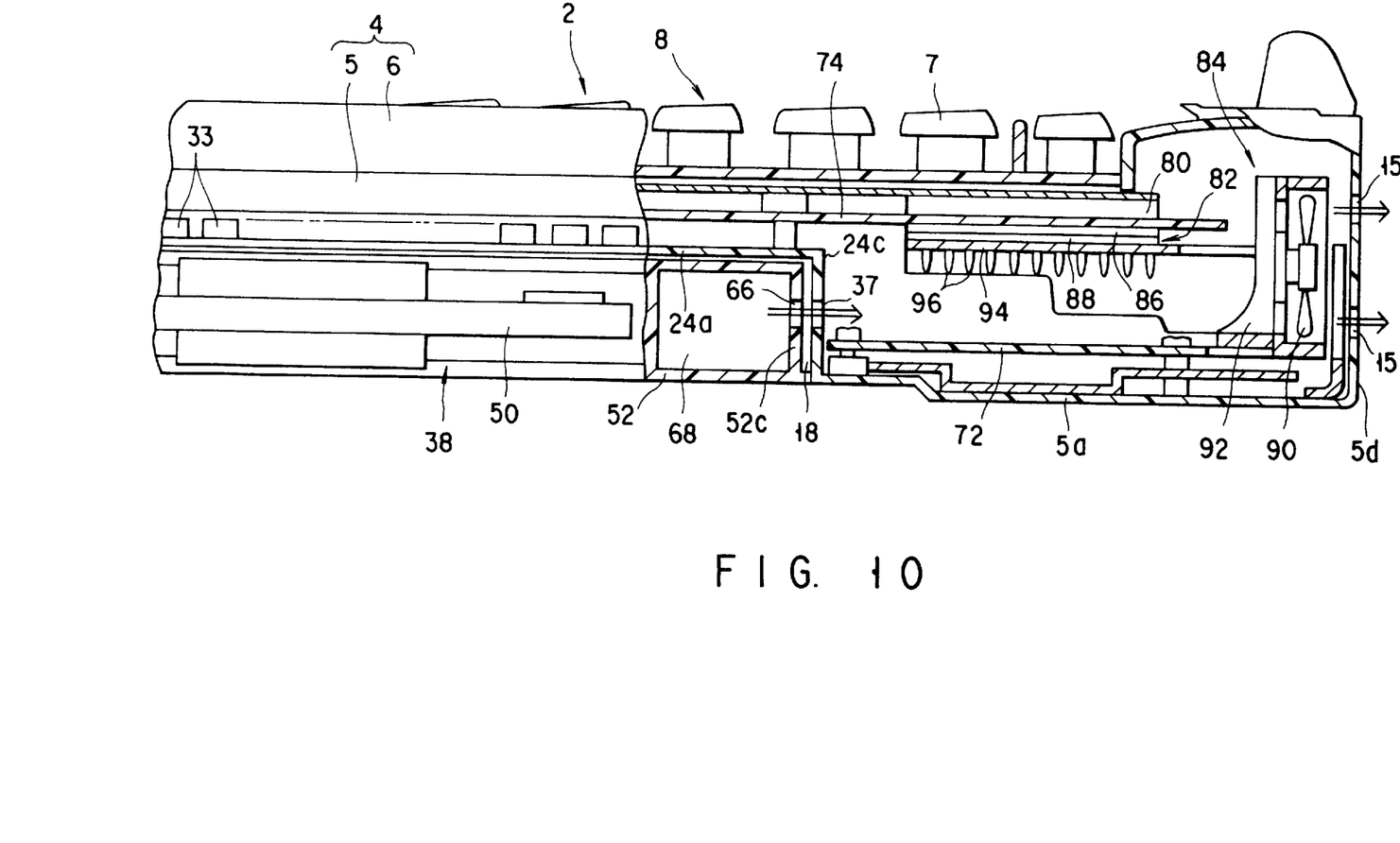
FIG. 10 is a partly cut-away side view of the portable computer.

As shown in FIGS. 9 and 10, in the lower housing 5 are arranged first and second printed circuit boards 72, 74 carrying a large number of electronic parts. The first printed circuit board 72 opposes in parallel with the bottom wall 5*a* of the lower housing 5. The printed circuit board 74 is arranged in parallel with the first printed circuit board 72 and separated from the latter by a predetermined distance. The first ventilation holes 37 formed in the side panel 24*c* of the inner walls of the housing 4 defining the pack storing section 18 communicate with the space between the first and second printed circuit boards 72, 74.

A TCP (tape carrier package) 78 including a semiconductor chip 76 that generates heat at an enhanced rate is mounted on the second printed circuit board 74. The upper surface of the TCP 78 is covered by a hollow cover 80. A thermal radiation unit 82 and a fan unit 84 for thermal radiation are arranged on the lower surface of the TCP 78, that is, the lower surface of the second printed circuit board 74

The thermal radiation unit 82 comprises a flat rectangular radiation panel 86 rigidly secured to the lower surface of the second printed circuit board 74 and located right below the TCP 78, and a rectangular elastic sheet 88 arranged under the lower surface of the radiation panel 86. The radiation panel 86 is made of aluminum and has a rectangular projection 86*a* projecting upward from the center of the upper surface thereof. The projection 86*a* is held in contact at the top thereof with the lower surface of the semiconductor chip 76 by way of a through hole (not shown) of the second printed circuit board 74. The elastic sheet 88 is made of a thermally conductive material typically prepared by adding alumina to silicon resin.

The fan unit 84 comprises a fan body 90, a frame 92 supporting the fan body, and a heat sink 94. The fan frame 92 and the heat sink 94 are integrally formed and typically made of aluminum.

The heat sink 94 includes a rectangular radiation panel 95 and a number of radiation pins 96 projecting downward from the lower surface of the radiation panel. The radiation panel 95 is arranged in parallel with the lower surface of the second printed circuit board 74 and its upper surface is held in contact with the lower surface of the second printed circuit board 74 through the thermal radiation unit 82. The heat sink 94 is secured to the second printed circuit board 74 along with the thermal radiation unit 82 and the cover 80 by means of four screws 98 such that it is located within the space between the first and second printed circuit boards 72, 74.

The fan body 90 is held by the fan frame 92 with its rotational center axis extending in parallel with the first and second printed circuit boards 72, 74 and is opposite to the exhaust port 15 of the rear wall of the housing 4. As the fan body 90 is driven to rotate, it draws air from the inside of the housing 4 and discharge it out of the housing 4 through the exhaust port 15.

As a packed device, e.g., the floppy disc drive unit 38 is mounted into the pack storing section 18 of the housing 4 of the portable computer 1 having the above described configuration, the bottom surface and the front surface of the floppy disc drive unit 38 are aligned respectively with the bottom and the right lateral side of the housing 4 and serve as part of the outer surface of the latter. As seen from FIG. 10, when the floppy disc drive unit 38 is housed in the pack storing section 18, the second ventilation holes 66 formed in the side panel 52c of the outer cover 52 of the unit are aligned respectively with the corresponding first ventilation holes 37 of the side panel 24c of the housing 4 so that the inside of the housing 4 is held in communication with the outside of the computer 1 by way of the air intake holes 70, the air flow path 68, the second ventilation holes 66 of the floppy disc drive unit 38, and the first ventilation holes 37 of the housing 4.

As the fan body 90 of the fan unit 84 is operated under this condition, it draws air from the inside of the housing 4 and discharge it out through the exhaust port 15, and fresh air is introduced into the air flow path 68 through the air intake holes 70 of the floppy disc drive unit 38. The introduced fresh air flows through the air flow path 68 to cool the inside of the floppy disc drive unit 38.

Further, the introduced fresh air flows into the housing 4 through the second and first ventilation holes 66, 37, and then flows through the space between the first and second printed circuit boards 72, 74 and the space around the heat sink 94 before it is discharged from the housing 4 through the exhaustion port 15. Thus, the electronic parts arranged on the first and second printed circuit boards 72, 74 are effectively cooled by fresh air. The heat generated from the semiconductor chip 76 arranged on the second printed circuit board 74 is transmitted to the radiation panel 95 of the heat sink 94 through the radiation panel 86 and the elastic sheet 88 of the thermal radiation unit 82 and then to the radiation pins 96, which effectively radiate the heat into air flowing around them to consequently cool the semiconductor chip 76.

As the fan body 90 is operated, fresh air is introduced into the housing 4 through the air intake holes 33 of the housing 4 and other air intake holes (not shown) to cool the electronic components arranged in the housing 4.

In the case wherein the floppy disc drive unit 38 is replaced by the CD-ROM drive unit 36, by rotating the fan main body 90, fresh air is introduced into the CD-ROM drive unit 36 through the air intake holes 65 and further into the housing 4 by way of the air flow path 62 and the second and first ventilation holes 60, 37 as in the same way described above, so that the inside of the CD-ROM drive unit 36 and that of the housing 4 can be effectively cooled.

As described above in detail, the portable computer 1 can introduce fresh air into the pack shaped device stored in the pack storing section 18 of the housing 4 to cool the pack shaped device by providing it with air intake holes, an air flow path and ventilation holes. At the same time, fresh air can also be introduced into the inside of the housing 4 by way of such air intake holes, an air flow path and ventilation holes. Therefore, the housing 4 does not need to have an additional space on its outer surface for arranging air intake holes, so that the housing 4 and the portable computer 1 can be down-sized. Additionally, since fresh air can be introduced into any desired area in the housing 4 to effectively cool electronic parts including the semiconductor chip 6 that emit heat at an enhanced rate and prevent any possible deterioration in the performance due to heat from taking place so that the portable computer may operate effectively at any time.

Note that the present invention is not limited to the above embodiment, which may be modified in various different ways without departing from the scope of the present invention. For example, the pack shaped device is not limited to a CD-ROM drive unit or a floppy disc drive unit as described above and may alternatively be a hard disc drive unit, a battery pack or some other device.

The air intake holes of the pack shaped device may be arranged anywhere on it so long as they are located on that surface of the device which is exposed to the outside when the device is fitted in the pack storing section. In other words, the air intake holes may be arranged on the bottom side of the pack shaped device instead of the front side. Similarly, the second ventilation holes of the pack shaped device may be arranged anywhere on it and show any contour so long as they are respectively arranged to face the corresponding first ventilation holes of the housing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. An electronic apparatus comprising:
   a housing having a peripheral recess defining a pack storing section;
   a pack shaped device serving as a packed module for performing a specified function and removably stored into the peripheral recess defining the pack storing section to serve as part of an outer surface of the electronic apparatus;
   ventilating means for introducing fresh air into the housing through an inside space of the pack shaped device stored in the pack storing section; and
   a fan arranged in the housing for sucking fresh air into the housing through the ventilating means and discharging it out of the housing through an inside space of the housing.

2. An electronic apparatus according to claim 1, wherein the ventilating means comprises first ventilation holes formed in the housing for keeping the inside space of the pack shaped device stored in the pack storing section in communication with the inside space of the housing, an air flow path defined in the pack shaped device, air intake holes formed in an outer surface of the pack shaped device and communicating with the air flow path, and second ventilation holes formed in the pack shaped device for keeping the air flow path in communication with the inside space of the housing.

3. An electronic apparatus according to claim 2, wherein the housing has an exhaust port opposing the first ventilation holes, and the fan is arranged between the first ventilation holes and the exhaust port so as to face the exhaust port.

4. The portable electronic apparatus according to claim 1, wherein the ventilating means introduces fresh air into the inside space of the packed shaped device stored in the pack storing section from the outside of the packed shaped device stored in the pack storing section and into the inside space of the housing from the inside space of the packed shaped device stored in the pack storing section.

5. The portable electronic apparatus according to claim 1, wherein the inside of the housing comprises at least one first heat-generating component and the inside of the pack storing section comprises at least one second heat-generating component.

6. The portable electronic apparatus according to claim 5, wherein the at least one first heat-generating component comprises at least one first electrical component and the at least one second heat-generating component comprises at least one second electrical component.

7. The portable electronic apparatus according to claim 6, wherein the at least one second electrical component comprises a CD-ROM drive unit.

8. The portable electronic apparatus according to claim 6, wherein the at least one second electrical component comprises a floppy disc drive unit.

9. An electronic apparatus comprising:

a housing having a peripheral recess defining a pack storing section and an exhaust port open to an outer surface of the housing;

a pack shaped device serving as a packed module and removably stored in the peripheral recess defining the pack storing section; and a fan arranged in the housing to oppose the exhaust port, for exhausting air from the housing through the exhaust port;

the peripheral recess of the housing having an inner wall further defining the pack storing section, and first ventilation holes formed in the inner wall for keeping an inside space of the housing in communication with an inside space of the pack shaped device stored in the pack storing section;

the pack shaped device having a first lateral wall facing the inner wall, a second lateral wall constituting part of the outer surface of the housing, second ventilation holes formed in the first lateral wall and respectively communicating with the corresponding first ventilation holes, air intake holes formed in the second lateral wall and open to the outside, and an air flow path for keeping the air intake holes in communication wit the second ventilation holes.

10. An electronic apparatus according to claim 9, wherein the housing includes a bottom wall, a lateral wall extending from the bottom wall, and a rear wall extending from the bottom wall and having the exhaust port; and the pack storing section is in the form of a rectangular recess open to the bottom wall and the lateral wall;

the inner wall of the housing including a side panel which opposes the rear wall of the housing and has the first ventilation holes.

11. An electronic apparatus according to claim 10, which further comprises a first printed circuit board arranged on the bottom wall of the housing, and a second printed circuit board arranged in the housing to face the first printed circuit board with a predetermined distance;

the first ventilation holes and the exhaust port being open to the space between the first and second printed circuit boards.

12. An electronic apparatus according to claim 11, which further comprises a heat sink arranged between the first ventilation holes and the exhaust port in the space between the first and second printed circuit boards and thermally connected to an electronic part mounted on the first printed circuit board.

13. The portable electronic apparatus according to claim 4, wherein the air intake holes of the pack shaped device introduce fresh air into the inside space of the pack shaped device from the outside of the pack shaped device and the first and second ventilation holes introduce fresh air into the inside space of the housing from the inside space of the pack shaped device stored in the pack storing section.

14. The portable electronic apparatus according to claim 4, wherein the inside of the housing comprises at least one first heat-generating component and the inside of the pack storing section comprises at least one second heat-generating component.

15. The portable electronic apparatus according to claim 14, wherein the at least one first heat-generating component comprises at least one first electrical component and the at least one second heat-generating component comprises at least one second electrical component.

16. The portable electronic apparatus according to claim 15, wherein the at least one second electrical component comprises a CD-ROM drive unit.

17. The portable electronic apparatus according to claim 15, wherein the at least one second electrical component comprises a floppy disc drive unit.

* * * * *

UNITED STATES PATENT AND TRADEMARK OFFICE
CERTIFICATE OF CORRECTION

PATENT NO.    : 6,072,696
DATED         : June 6, 2000
INVENTOR(S)   : Yasuyuki Horii It is certified that error appears in the above-identified patent and that said Letters Patent is hereby corrected as shown below:

Claim 9, column 11,
Line 46, "wit" should read --with--.

Claim 13, column 12,
Lines 23-24, "claim 4" should read --claim 9--.

Claim 14, column 12,
Lines 30-31, "claim 4" should read --claim 9--.

Signed and Sealed this

Nineteenth Day of June, 2001

*Attest:*

NICHOLAS P. GODICI
*Attesting Officer*     *Acting Director of the United States Patent and Trademark Office*